United States Patent
Koo

(10) Patent No.: US 12,247,845 B2
(45) Date of Patent: Mar. 11, 2025

(54) METHOD FOR CALCULATING TRAVEL DISTANCE AND A VEHICLE UTILIZING THE SAME

(71) Applicants: HYUNDAI MOTOR COMPANY, Seoul (KR); KIA MOTORS CORPORATION, Seoul (KR)

(72) Inventor: Bon Chang Koo, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 922 days.

(21) Appl. No.: 17/093,115

(22) Filed: Nov. 9, 2020

(65) Prior Publication Data
US 2021/0389158 A1    Dec. 16, 2021

(30) Foreign Application Priority Data
Jun. 16, 2020   (KR) .................. 10-2020-0072910

(51) Int. Cl.
G01C 22/00       (2006.01)
G01P 3/00        (2006.01)

(52) U.S. Cl.
CPC .............. *G01C 22/00* (2013.01); *G01P 3/00* (2013.01)

(58) Field of Classification Search
CPC .................................. G01C 22/00; G01P 3/00
See application file for complete search history.

(56) References Cited

U.S. PATENT DOCUMENTS

| | | | | |
|---|---|---|---|---|
| 5,897,602 A | * | 4/1999 | Mizuta | G07C 5/0858 340/995.18 |
| 7,908,050 B2 | * | 3/2011 | Koie | G01C 21/36 340/425.5 |
| 9,139,095 B2 | * | 9/2015 | Kim | B60L 3/12 |
| 9,171,408 B2 | * | 10/2015 | Lee | B60L 15/2054 |
| 9,175,996 B2 | * | 11/2015 | Lee | G01F 9/023 |
| 2015/0149032 A1 | * | 5/2015 | Lee | B60W 10/06 701/34.2 |

FOREIGN PATENT DOCUMENTS

| | | | |
|---|---|---|---|
| JP | 2001208564 | * | 8/2001 |
| KR | 10-0569939 B1 | * | 4/2006 |
| KR | 2008-0032770 | * | 4/2008 |

* cited by examiner

*Primary Examiner* — Mohamed Charioui
*Assistant Examiner* — Lynda Dinh
(74) *Attorney, Agent, or Firm* — MCDONNELL BOEHNEN HULBERT & BERGHOFF LLP

(57) ABSTRACT

A vehicle may include a cluster and an engine control unit (ECU), where the cluster may generate a travel distance signal that indicates a travel distance detected by a vehicle speed sensor, and the ECU may be configured to set a travel distance at the time of an immediately previous key-OFF as a current travel distance when the travel distance signal indicates the initial value at the time of an ignition-ON, and to set the temporary previous travel distance and the temporary current travel distance as a previous travel distance and the current travel distance, respectively, when a temporary previous travel distance prior to a current time point by a predetermined period and a temporary current travel distance at the current time point are greater than or equal to the set current travel distance.

10 Claims, 3 Drawing Sheets

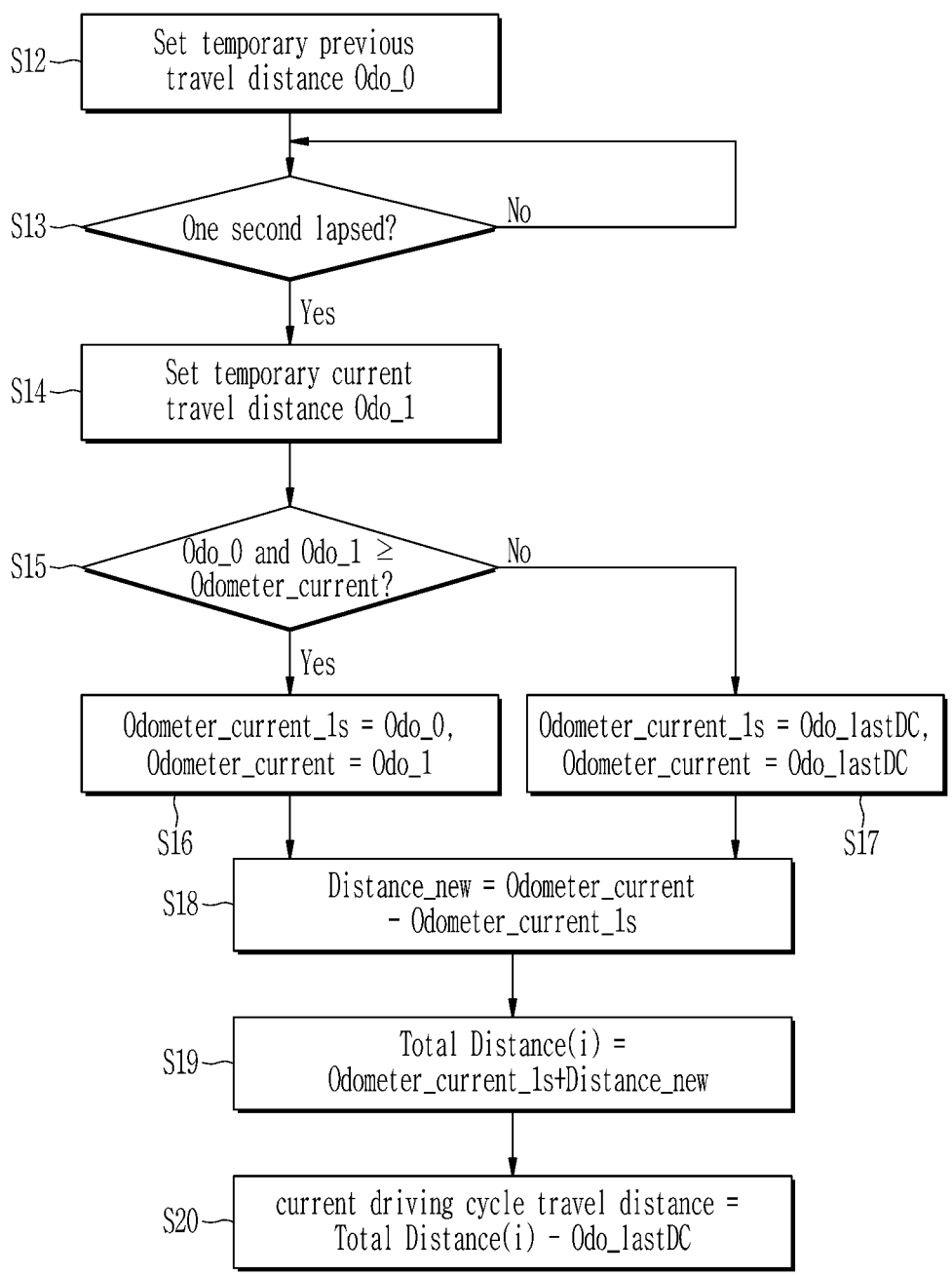

METHOD FOR CALCULATING TRAVEL DISTANCE AND A VEHICLE UTILIZING THE SAME

CROSS-REFERENCE TO RELATED APPLICATION

This application claims priority to and the benefit of Korean Patent Application No. 10-2020-0072910 filed on Jun. 16, 2020, the entire contents of which are incorporated herein by reference.

TECHNICAL FIELD

The present disclosure relates to a method for calculating a travel distance and a vehicle utilizing the same.

BACKGROUND

A cluster transmits a travel distance through CAN communication, but there is a problem of transmitting abnormal travel distance such as an initial value, e.g., 0x000000, or a fault signal, e.g., 0xFFFFFF, until the cluster CAN initialization is completed. As a result, an error of subsequent travel distance may occur, and an error may also occur in a cumulative travel distance, which is an accumulation value.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a vehicle and a method for calculating a travel distance of a vehicle capable of minimizing travel distance error due to abnormally received travel distance signal is provided.

An exemplary vehicle may include a cluster and an engine ECU. The cluster may generate a travel distance signal that indicates a travel distance detected by using a vehicle speed sensor. The engine ECU may be configured to set a travel distance at a time of an immediately previous key-OFF as a current travel distance when a received travel distance signal indicates an initial value at a time of an ignition-ON, and to set a temporary previous travel distance and a temporary current travel distance as a previous travel distance and the current travel distance, respectively, when a temporary previous travel distance prior to a current time point by a predetermined period and a temporary current travel distance at the current time point are greater than or equal to the set current travel distance.

The engine ECU may be configured to set the temporary previous travel distance and the temporary current travel distance as the travel distance at the time of the immediately previous key-OFF, when the received travel distance signal indicates the initial value at the time of the ignition-ON, or when the temporary previous travel distance and the temporary current travel distance are below the set current travel distance.

The engine ECU may be configured to calculate the travel distance while subsequently calculating and updating the previous travel distance and the current travel distance based on the set previous travel distance and the set current travel distance.

The travel distance may include a distance traveled for a unit time, a total cumulative travel distance, and a distance traveled during a current driving cycle. The engine ECU may be configured to calculate a unit time travel distance by subtracting the previous travel distance from the current travel distance, to update the total cumulative travel distance by adding the unit time travel distance to the previous travel distance, and to calculate the distance traveled during the current driving cycle by subtracting the travel distance at the time of the immediately previous key-OFF from the total cumulative travel distance.

The engine ECU may be configured to finish the travel distance calculation when a travel distance signal received at the time of the ignition-ON is a fault signal.

The engine ECU may be configured to store the current travel distance as the travel distance at a time of a current key-OFF, and to calculate a distance traveled during a current driving cycle, when the vehicle is turned to a key-OFF state.

An exemplary method for calculating a travel distance of a vehicle includes, generating a travel distance signal indicating a travel distance; determining whether a travel distance signal received at a time of an ignition-ON indicates an initial value, setting a travel distance at a time of an immediately previous key-OFF as a current travel distance when a received travel distance signal is the initial value, comparing a temporary previous travel distance prior to a current time point by a predetermined period and a temporary current travel distance at the current time point with the set current travel distance, and setting the temporary previous travel distance and the temporary current travel distance as a previous travel distance and the current travel distance, respectively, when the temporary previous travel distance and the temporary current travel distance are greater than or equal to the set current travel distance.

An exemplary method for calculating a travel distance of a vehicle may further include, setting the temporary previous travel distance and the temporary current travel distance as the travel distance at the time of the immediately previous key-OFF when the temporary previous travel distance and the temporary current travel distance are below the set current travel distance.

An exemplary method for calculating a travel distance of a vehicle may further include, calculating the travel distance while subsequently calculating and updating the previous travel distance and the current travel distance based on the set previous travel distance and the set current travel distance.

The calculating of the travel distance includes, calculating a unit time travel distance by subtracting the previous travel distance from the current travel distance, updating a total cumulative travel distance by adding the unit time travel distance to the previous travel distance, and calculating the distance traveled during a current driving cycle by subtracting the travel distance at the time of the immediately previous key-OFF from the total cumulative travel distance.

An exemplary method for calculating a travel distance of a vehicle may further include, finishing the calculation of the travel distance when a travel distance signal received at the time of the ignition-ON is a fault signal.

An exemplary method for calculating a travel distance of a vehicle may further include, when the vehicle is turned to a key-OFF state, storing the current travel distance as the travel distance at a time of a current key-OFF, and calculating a distance traveled during a current driving cycle.

According to an exemplary embodiment, a vehicle and a method for calculating a travel distance of vehicle that may minimize travel distance error due to abnormally received travel distance signal.

DRAWINGS

FIG. 2 and FIG. 3 are respectively a flowchart of a method for calculating and storing a cumulative travel distance in one form of the present disclosure.

DETAILED DESCRIPTION

Figure 1:
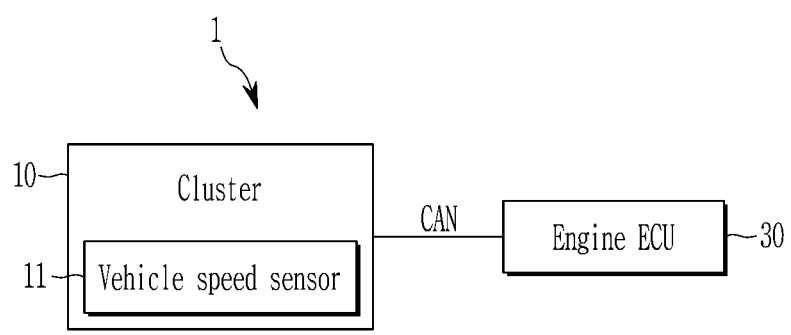
FIG. 1 illustrates a principal parts of a vehicle related to a travel distance in one form of the present disclosure.

The present disclosure relates to a method for calculating a cumulative travel distance for calculating fuel efficiency in relation with greenhouse gas and a current driving travel distance, i.e., a distance traveled during a current driving period. In order to satisfy the reinforced North American On-Board diagnostics (OBD) law, the present disclosure may calculate an accurate cumulative distance and travel distance.

In some forms of the present disclosure, the travel distance of the vehicle may be stored in one controller as a master, and information related to the travel distance may be transmitted to other controllers. The master may be a cluster. An engine electronic control unit (ECU) may receive the vehicle travel distance through cluster.

The engine ECU may calculate a current driving travel distance as a difference between a travel distance received at the time of an ignition-ON and a currently received travel distance, i.e., as a value of a current travel distance received from the cluster minus an initial travel distance received at the time of an ignition-ON. The engine ECU may calculate a final cumulative travel distance as a sum of a last stored cumulative travel distance and the current driving travel distance, i.e., as a value of the last stored cumulative travel distance+the current driving travel distance. The current driving travel distance and the final cumulative travel distance may be stored separately.

Upon receiving a fault signal, e.g., 0xFFFFFF, the engine ECU may stop calculating the travel distance, and upon receiving an initial value, e.g., 0x000000, the engine ECU may compensate the travel distance received at the time of an initial ignition-ON, thereby improving the occurrence of errors. The cumulative travel distance stored by the engine ECU may be used as main information of vehicle tracking (vehicle driving information).

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present disclosure may obscure the gist of the present disclosure, it will be omitted. The accompanying drawings are provided only in order to allow exemplary embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprises" and "have" used in the present specification specify the presence of stated features, numerals, steps, operations, components, parts, or combinations thereof, but do not preclude the presence or addition of one or more other features, numerals, steps, operations, components, parts, or combinations thereof.

FIG. 1 illustrates a principal parts of a vehicle related to a travel distance according to an exemplary embodiment.

A vehicle 1 includes a cluster 10 and an engine ECU 30. The cluster 10 includes a vehicle speed sensor 11. The vehicle speed sensor 11 detects at least one of rotations speeds of front and rear wheels of the vehicle 1, and generates a signal indicating the rotation speed.

The cluster 10 may calculate a travel distance based on the signal generated by the vehicle speed sensor 11, store the travel distance, generate a travel distance signal indicating the travel distance, and transmit the travel distance signal to the engine ECU 30 through a CAN communication.

The engine ECU 30 stores vehicle driving information. In particular, a cumulative travel distance and the current driving travel distance are legally required to be stored by the engine ECU 30. It is legally regulated that the engine ECU 30 must provide the cumulative travel distance data for an inspection of the exhaust gas.

Figure 2:
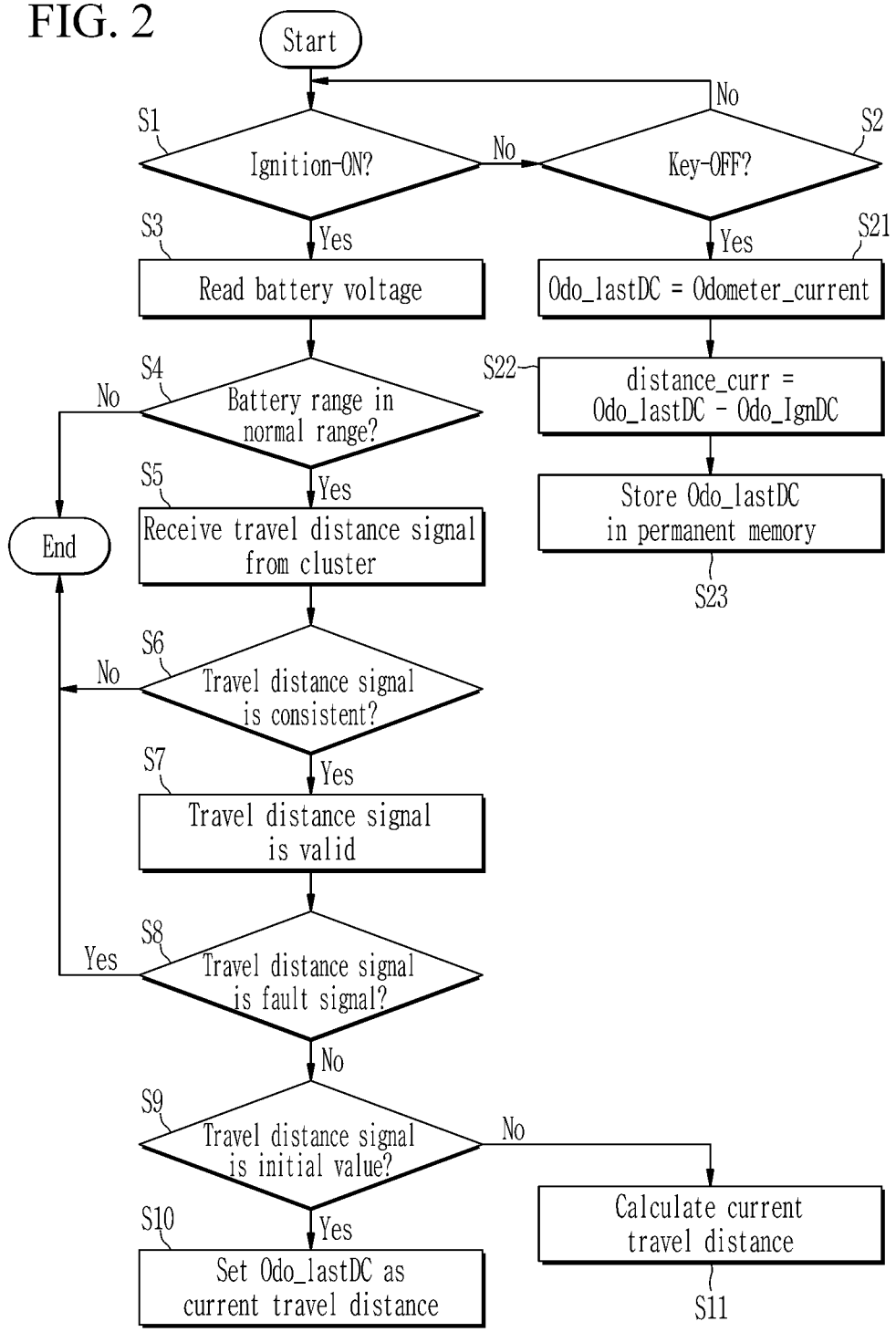

FIG. 2 and FIG. 3 are respectively a flowchart of a method for calculating and storing a cumulative travel distance in some forms of the present disclosure.

As shown in FIG. 2, at step S1, the engine ECU 30 determines whether the vehicle 1 is turned to an ignition-ON state.

When the vehicle 1 is not turned to the ignition-ON state (S1—No), the engine ECU 30 determines, at step S2, whether the vehicle is turned to a key-OFF state.

When the vehicle 1 is not turned to the key-OFF state (S2—No), the process returns to the step S1.

When the vehicle 1 is turned to the ignition-ON state (S1—Yes), the engine ECU 30 reads a battery voltage provided in the vehicle 1, at step S3.

At step S4, the engine ECU 30 determines whether the battery voltage read at the step S3 is in a normal range, e.g., 10V-16V. When the battery voltage is out of a normal range (S4—No), the engine ECU finishes the travel distance calculation.

When the battery voltage is in the normal range, e.g., 10V-16V (S4—Yes), the engine ECU 30 receives a signal related to a travel distance (hereinafter, called a travel distance signal) from the cluster 10, at step S5. The cluster 10 calculates and stores the travel distance, and may transmit a travel distance signal indicating a current travel distance to the engine ECU 30 through CAN communication, in response to a request from the engine ECU 30. The cluster 10 may also transmit the travel distance signal to another controller through the CAN communication under a request for the current travel distance.

At step S6, the engine ECU 30 determines whether or not the travel distance signal received through CAN communication is consistent. For example, the engine ECU 30 may perform an alive check and/or a checksum process.

The alive check means that a transmitting controller and a receiving controller respectively counts a number of transmission at each transmission of signal, and a count value in a signal transmitted by the transmitting controller is compared with a count value for the signal received at the receiving controller. That is, the count value included in the travel distance signal transmitted from the cluster 10 is compared with the count value of signals received by the engine ECU 30, and the engine ECU 30 determines that a lost signal does not exist when the two count values are the same. j Alternatively, a checksum performed for the signal received by the receiving controller may be compared with a checksum transmitted together with the signal from the transmitting controller. That is, the engine ECU 30 may compare a checksum received from the cluster 10 with a checksum calculated by the engine ECU 30, and may determine whether the received signal is valid in units of bytes.

When a consistency is found (S6—Yes), the engine ECU 30 determines, at step S7, that the travel distance signal received from the cluster 10 is a valid signal.

When a consistency is not found (S6—No), the engine ECU 30 finishes the travel distance calculation.

Subsequently to the step S7, the engine ECU 30 determines whether the travel distance signal is a fault signal, at step S8. For example, the value of fault signal may be "0XFFFFFF", and the engine ECU 30 may compare the travel distance signal and the fault signal.

When the travel distance signal is the fault signal (S7—Yes), the engine ECU 30 finishes the travel distance calculation.

When the travel distance signal is not the fault signal (S—No), the engine ECU 30 determines, at step S9, whether the travel distance signal is an initial value. For example, the initial value may be "0x000000", and the engine ECU 30 may compare the travel distance signal with the initial value.

When the travel distance signal is the initial value (S9—Yes), the engine ECU 30 may set a travel distance Odo_lastDC received at the time of immediately previous key-OFF as the current travel distance Odometer_current, at step S10.

When the travel distance signal is not the initial value (S9—No), the engine ECU 30 calculates the current travel distance based on the travel distance signal, at step S11.

In addition, when the travel distance signal is the initial value (S9—Yes), the engine ECU 30 may monitor whether the travel distance signal is normally generated and transmitted from the cluster 10 during a predetermined monitoring period.

FIG. 3 is a flowchart showing an operation of the engine ECU during a monitoring period after receiving the initial value of the travel distance signal.

At step S12, the engine ECU 30 sets a temporary previous travel distance Odo_0 as a travel distance calculated based on a travel distance signal prior to a current time point by a predetermined period (e.g., 1 second)

Then, at step S13, the engine ECU 30 determines whether the predetermined period, i.e., 1 second, has lapsed. When 1 second has not lapsed, the engine ECU 30 continues monitoring time lapse.

When the predetermined period of 1 second has lapsed, the engine ECU sets a temporary current travel distance Odo_1 as a travel distance calculated based on a current travel distance signal, at step S14.

Subsequently at step S15, the engine ECU 30 determined whether the temporary previous travel distance Odo_0 and the temporary current travel distance Odo_1 are greater than or equal to the current travel distance Odometer_current set at the step S10. The current travel distance Odometer_current set at the step S10 is a travel distance Odo_lastDC received at the time of the immediately previous key-OFF.

When the temporary previous travel distance Odo_0 and the temporary current travel distance Odo_1 are greater than or equal to the current travel distance Odometer_current (S15—Yes), the engine ECU 30 determines that the travel distance signal is normally generated by and transmitted from the cluster 10, and sets the temporary previous travel distance Odo_0 and the temporary current travel distance Odo_1 as a previous travel distance Odometer_current_1s and the current travel distance Odometer_current, at step S16.

When the temporary previous travel distance Odo_0 and the temporary current travel distance Odo_1 is below the current travel distance Odometer_current (S15—No), the engine ECU 30 determines that there exists an error in the travel distance signal, and sets the travel distance Odo_lastDC received at the time of the immediately previous key-OFF as the previous travel distance Odometer_current_1s and the current travel distance Odometer_current, at step S17.

Although the current travel distance Odometer_current and the previous travel distance Odometer_current_1s value are differently set by the step S16 and the step S17, the travel distance calculated based on the current travel distance set by the step S16 or the step S17 depending on the result of the step S15 show significantly reduced error, when compared to the travel distance calculated based on the travel distance signal with errors caused by fault signal or initial value.

Based on the previous travel distance and the current travel distance set by either of the step S16 and the step S17, while subsequently calculating and updating the previous travel distance and the current travel distance, the engine ECU 30 may calculate a travel distance for a unit time, the total cumulative travel distance updated by a unit time, and the travel distance during a corresponding driving cycle.

In more detail, the unit time may be 1 second, the engine ECU 30 may calculate a unit time travel distance according to equation 1 shown below, at step S18.

$$\text{Distance\_new} = \text{Odometer\_current} - \text{Odometer\_current\_1}s \qquad \text{(equation 1)}$$

Here, Distance_new denotes the unit time travel distance, Odometer_current denotes the current travel distance, and Odometer_current_1s denotes the previous travel distance.

The engine ECU 30 may calculate and update a current (i-th) total cumulative travel distance according to equation 2 shown below, unit time, at step S19.

$$\text{Total Distance}(i) = \text{Odometer\_current\_1}s + \text{Distance\_new} \qquad \text{(equation 2)}$$

Here, Total Distance(i) denotes the total cumulative travel distance, Odometer_current_1s denotes the previous travel distance, and Distance_new denotes the unit time travel distance.

At step S20, the engine ECU 30 may calculate a total distance for a current driving cycle according to equation 3 shown below.

$$\text{current driving cycle travel distance} = \text{Total Distance}(i) - \text{Odo\_lastDC} \quad \text{(equation 3)}$$

Here, Total Distance(i) denotes a currently total cumulative travel distance, and Odo_lastDC denotes the travel distance at the time of the immediately previous key-OFF.

In equation 3, "Odo_lastDC" denotes the travel distance received at the time of immediately previous key-OFF.

Referring back to FIG. 2, when the vehicle 1 is determined to be in the key-OFF state (S2—Yes), the engine ECU 30 sets the current travel distance Odometer_current as the travel distance Odo_lastDC at the time of a current key-OFF (i.e., Odo_lastDC=Odometer_current), at step S21.

Subsequently at step S22, the engine ECU 30 calculates a distance traveled during the current driving cycle. For example, the engine ECU 30 may calculate the distance distance_curr traveled during the current driving cycle by subtracting a travel distance Odo_IgnDC at the time of the ignition-ON from the travel distance Odo_lastDC at the time of the current key-OFF. The travel distance Odo_IgnDC at the time of the ignition-ON may be the travel distance at the time of the immediately previous key-OFF.

At step S23, the engine ECU 30 may store the travel distance Odo_lastDC at the time of the current key-OFF in a permanent memory.

As such, according to an exemplary embodiment, when an error signal for the travel distance is received due to an error of cluster initialization, the cumulative travel distance is replaced with the travel distance received at the time of the key-OFF at the immediately previous driving cycle, and thereby the error the engine ECU in storing the travel distance may be prevented.

When the current travel distance value is smaller than the travel distance at the time of receiving the initial value signal or received immediately previously (e.g., prior by 1 second), the travel distance received 1 second previously may be substituted for the current travel distance, and thereby ECU storage error may be prevented. Through this, it is possible to satisfy the reinforced North American law, which is a law on the submission of driving information.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

1: vehicle
10: cluster
11: vehicle speed sensor
30: engine ECU

What is claimed is:

1. A vehicle, comprising:
   a cluster configured to generate a travel distance signal that indicates a travel distance detected by a vehicle speed sensor; and
   an engine control unit (ECU) configured to:
   set a travel distance at a time of an immediately previous key-OFF as a current travel distance when the travel distance signal indicates an initial value at a time of an ignition-ON; and
   set a temporary previous travel distance and a temporary current travel distance as a previous travel distance and the current travel distance, respectively, when the temporary previous travel distance prior to a current time point by a predetermined period is greater than or equal to the set current travel distance that is set at the time of an ignition-ON and the temporary current travel distance at the current time point is greater than or equal to the set current travel distance that is set at the time of an ignition-ON;
   wherein the ECU is configured to:
   set the temporary previous travel distance and the temporary current travel distance as the travel distance at the time of the immediately previous key-OFF when the travel distance signal indicates the initial value at the time of the ignition-ON, or when the temporary previous travel distance and the temporary current travel distance are below the current travel distance that is set at the time of the ignition-ON;
   determine whether the travel distance signal received through CAN communication is consistent;
   determine that the travel distance signal is valid when a consistency is found; and
   finish calculation of the travel distance when a consistency is not found;
   thereby minimizing error in cumulative travel distance values.

2. The vehicle of claim 1, wherein the ECU is configured to:
   calculate the travel distance while subsequently calculating and updating the previous travel distance and the current travel distance based on the set previous travel distance and the current travel distance that is set at the time of an ignition-ON.

3. The vehicle of claim 2, wherein the travel distance comprises a distance traveled for a unit time, a total cumulative travel distance, and a distance traveled during a current driving cycle, and
   wherein the ECU is configured to:
   calculate a unit time travel distance by subtracting the previous travel distance from the current travel distance;
   update the total cumulative travel distance by adding the unit time travel distance to the previous travel distance; and
   calculate the distance traveled during the current driving cycle by subtracting the travel distance at the time of the immediately previous key-OFF from the total cumulative travel distance.

4. The vehicle of claim 1, wherein the ECU is configured to:
   complete calculation of the travel distance when the travel distance signal at the time of the ignition-ON is a fault signal.

5. The vehicle of claim 1, wherein, the ECU is configured to:
   store the current travel distance as the travel distance at a time of a current key-OFF; and
   calculate a distance traveled during a current driving cycle when the vehicle is turned to a key-OFF state.

6. A method for calculating a travel distance of a vehicle, comprising:
   generating, by a cluster, a travel distance signal indicating the travel distance;

determining, by an engine control unit (ECU), whether the travel distance signal at a time of an ignition-ON indicates an initial value;

setting, by the ECU, a travel distance at a time of an immediately previous key-OFF as a current travel distance when the travel distance signal is the initial value;

comparing, by the ECU, a temporary previous travel distance prior to a current time point by a predetermined period and a temporary current travel distance at the current time point with the current travel distance that is set at the time of an ignition-ON;

setting, by the ECU, the temporary previous travel distance and the temporary current travel distance as a previous travel distance and the current travel distance, respectively, when the temporary previous travel distance is greater than or equal to the current travel distance that is set at the time of the ignition-ON and the temporary current travel distance at the current time point is greater than or equal to the set current travel distance that is set at the time of an ignition-ON; and setting, by the ECU, the temporary previous travel distance and the temporary current travel distance as the travel distance at the time of the immediately previous key-OFF when the temporary previous travel distance and the temporary current travel distance are below the current travel distance that is set at the time of the ignition-ON;

determining, by the ECU, whether the travel distance signal received through CAN communication is consistent;

determining, by the ECU, that the travel distance signal is valid when a consistency is found; and finishing, by the ECU, calculation of the travel distance when a consistency is not found;

thereby minimizing error in cumulative travel distance values.

7. The method of claim 6, wherein the method further comprises:

calculating, by the ECU, the travel distance while subsequently calculating and updating the previous travel distance and the current travel distance based on the set previous travel distance and the current travel distance that is set at the time of the ignition-ON.

8. The method of claim 7, wherein calculating the travel distance comprises:

calculating a unit time travel distance by subtracting the previous travel distance from the current travel distance;

updating a total cumulative travel distance by adding the unit time travel distance to the previous travel distance; and calculating the distance traveled during a current driving cycle by subtracting the travel distance at the time of the immediately previous key-OFF from the total cumulative travel distance.

9. The method of claim 6, wherein the method further comprises:

completing a calculation of the travel distance when the travel distance signal at the time of the ignition-ON is a fault signal.

10. The method of claim 6, wherein the method further comprises:

when the vehicle is turned to a key-OFF state, storing the current travel distance as the travel distance at a time of a current key-OFF, and calculating a distance traveled during a current driving cycle.

* * * * *